2,965,656
PROCESS FOR PREPARING SUBSTITUTED 1-AMINO-2,4-BENZENE-DISULFONAMIDES

Frederick C. Novello, Lansdale, Pa., assignor to Merck & Co., Inc., Rahway, N.J., a corporation of New Jersey No Drawing. Filed Nov. 7, 1957, Ser. No. 694,915

7 Claims. (Cl. 260—397.7)

This invention is concerned with a novel process for the preparation of disulfamylaniline compounds having the general structural formula

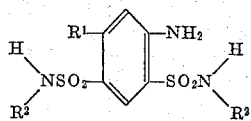

wherein $R^1$ is halogen, such as chlorine, bromine, or fluorine, a lower alkyl radical advantageously having from 1 to 5 carbon atoms, a lower alkoxy radical also advantageously containing from 1 to 5 carbon atoms in the alkyl portion of the radical, and nitro or amino groups, and $R^2$ is hydrogen or a lower alkyl radical.

The process of this invention can be illustrated by the series of reactions illustrated below:

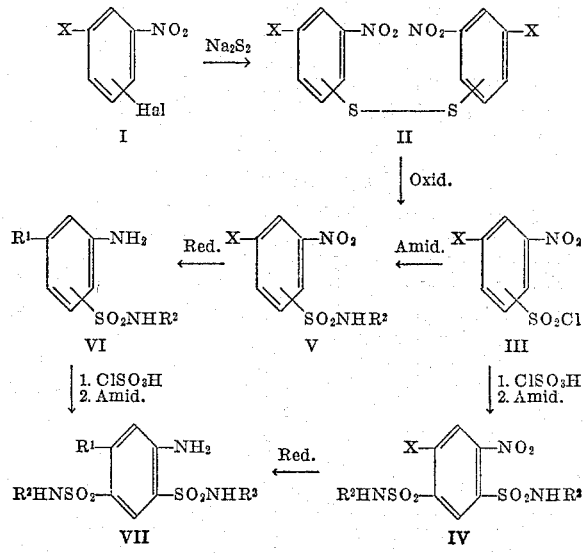

In the above reaction scheme, X represents a halogen, a lower alkyl radical, a lower alkoxy radical or a nitro group; Hal represents a halogen, particularly chlorine or bromine; and $R^1$ and $R^2$ have the meaning assigned to each of them above. The variable radical Hal is either ortho or para to the nitro group.

The novel method illustrated above for preparing the disulfamylaniline compounds comprises converting a halonitrobenzene, I, by treatment with sodium disulfide, to the di-(nitrophenyl) disulfide, II. The disulfide thus obtained is oxidized with chlorine to a nitrobenzenesulfonyl chloride, III, which, upon treatment with ammonia or a mono-lower-alkylamine, is converted to the corresponding sulfonamide, V. The nitrobenzenesulfonamide then is reduced to convert the nitro to an amino group and the resulting aniline compound, VI, is treated with chlorosulfonic acid and then with ammonia or a mono-lower-alkylamine to form the desired 2,4-disulfamylaniline compound, VII.

The disulfamylaniline compound, VII, also can be obtained from the nitrobenzenesulfonyl chloride, III, by first treating the sulfonyl chloride compound with chlorosulfonic acid in the presence of an alkali metal halide and then with ammonia or a mono-lower-alkylamine to form the disulfamylnitrobenzene, IV, and then reducing the nitro to the amino group to obtain the disulfamylaniline compound, VII.

The novel method of this invention is of particular value because it is possible, through its use, to obtain unsymmetrically substituted disulfamylaniline compounds and especially, to prepare disulfamylaniline compounds wherein substitution occurs on the nitrogen atom of the sulfamyl radical at the 2-position.

The novel method of this invention is carried out by preparing a solution of sodium disulfide which t_en is admixed with a solution of the selected halonitrobenzene, I. The reactants can be dissolved in an aqueous medium or in alcohol and are employed in the ratio of two equivalents of the halonitrobenzene to at least one equivalent of sodium disulfide, although more sodium disulfide can be employed if desired. In carrying out this step, it is advisable to add one of the solutions, such as the disulfide solution, to the other solution in dropwise fashion as the reaction is vigorous and exothermic. When the addition has been completed, the mixture is heated between about 50–100° C., preferably on the steam bath, to form the di-nitrophenyl disulfide, II. $K_2S_2$ can replace $Na_2S_2$.

The disulfide, II, then is oxidized by treatment with chlorine in a medium made acidic with acetic acid or with concentrated hydrochloric acid or with mixtures of concentrated hydrochloric and nitric acid or acetic acid, while heating at a temperature between about 25–70° C. The chlorine advantageously is bubbled into the reaction mixture at a slow rate thus forming the corresponding nitrobenzenesulfonyl chloride, III The 2-nitrobenzenesulfonyl chloride, III, is amidated by reaction with at least two molar equivalents of ammonia or a mono-lower-alkylamine. The reaction mixture preferably is cooled in an ice bath during an initial period of about 30–60 minutes and subsequently it is heated to between 50–100° C. to form the corresponding nitrobenzenesulfonamide, V. Ammonia in substantially any form can be employed in the amidation step, such as aqueous or alcoholic ammonia, liquid ammonia, or by dissolving the sulfonyl chloride, III, in an organic solvent and bubbling ammonia gas into the solution to form the sulfamyl derivative, V.

The nitro group of the nitrobenzenesulfonamide, V, is reduced to the amino group either catalytically employing, for example, a platinum catalyst or palladium on charcoal, or it can be reduced chemically with, for example, iron in an acidic or an alkaline medium such as by employing iron powder and hydrochloric acid or ferrous sulfate and ammonium hydroxide or chemical reduction can be effected with sodium hydrosulfide and the like, thus forming the desired sulfamylaniline Compound, VI.

The sulfamylaniline, VI, is chlorosulfonated by reaction with at least two equivalents of chlorosulfonic acid advantageously by heating at between about 50–100° C., and the sulfonyl chloride thus formed then is amidated with ammonia or a mono-lower-alkylamine employing the type of reagents, proportions and methods described above for the amidation of Compound III to Compound V, thus forming the disulfamylaniline compound, VII.

The nitrobenzenesulfonyl chloride, III, also can be converted to the disulfamylaniline compound, VII, by first chlorosulfonating Compound III with chlorosulfonic acid in the presence of an alkali metal halide and then forming the disulfamylnitrobenzene compound, IV, by amidation employing ammonia or a mono-lower-alkylamine and subsequently reducing the nitro to the amino group. The chlorosulfonation of Compound III, can be carried out in the presence of any of the alkali metal halides, such as sodium, potassium or lithium chloride, and the like. For all practical purposes, sodium chloride can be used as it is readily available, cheap, and in its presence the reaction proceeds quite smoothly. As the chlorosulfonation reaction involving these ingredients is quite vigorous, it is preferred to add the nitrobenzenesulfonyl chloride, III, to the chlorosulfonic acid portionwise with stirring and cooling. After all of Compound III has been added, the alkali metal halide is added portionwise to allow for the evolution of hydrogen halide at a moderate rate. Following this, the mixture is heated at between about 100–200° C., preferably in an oil bath. The amidation of the disulfonyl chloride thus obtained and the reduction of the nitro group of Compound IV are carried out as described above for similar reactions except at least four equivalents of the amidating agent is used.

The disulfamylaniline compounds prepared by the novel method of this invention are useful pharmacotherapeutic agents principally because of their diuretic, natriuretic, and/or saluretic properties. The disulfamylaniline compounds additionally are useful as intermediates in preparing sulfamyl substituted 1,2,4-benzothiadiazine-1,1-dioxide compounds which also possess diuretic, natriuretic, and/or saluretic properties. The disulfamylaniline compounds as well as the benzothiadiazine-1,1-dioxide compounds are effective upon oral administration in the form of tablets or capsules and the like as well as by injection when dissolved in a dilute alkaline medium or in polyethylene glycol. The pharmacotherapeutic properties of the compounds prepared by the novel method of this invention make them particularly useful in the treatment of congestive heart failure and other abnormalities which produce an edematous condition in the body or which produce an imbalance in the electrolyte concentration in the body, as, for example, those in which an abnormal retention of sodium occurs.

The application of the novel method of this invention to the preparation of disulfamylaniline compounds is illustrated by the following examples.

EXAMPLE 1

*5-chloro-2,4-disulfamylaniline*

Step A.—To a solution of 360 g. of (1.5 mole) of crystalline sodium sulfide in 1500 ml. of 90% ethanol, 48 g. (1.5 atoms) of finely ground sulphur is added and the mixture heated on the steam bath until the sulphur dissolves. The sodium disulfide solution thus obtained then is added dropwise to a solution of 384 g. (2.0 mole) of 2,5-dichloronitrobenzene in 650 ml. of 95% ethanol over a period of 2 hours. The mixture then is heated on the steam bath for 3 hours and, after cooling in an ice bath, the crystalline precipitate is collected by suction filtration, transferred to a 1 liter beaker and stirred thoroughly with 500 ml. of water to remove the sodium chloride. The precipitate which forms is collected on the filter and washed with 100 ml. of alcohol and dried at 55° C. yielding di-(4-chloro-2-nitrophenyl) disulfide.

Step B.—A stream of chlorine is passed into a mixture of 245 g. (0.65 mole) of the thus obtained di-(4-chloro-2-nitrophenyl) disulfide, 1 liter of concentrated hydrochloric acid and 200 ml. concentrated nitric acid, at the rate of about 2 bubbles per second. The temperature is maintained at 70° C. by intermittent heating on the steam bath over a period of 2 hours. The 5-chloronitrobenzene-2-sulfonyl chloride is separated from the supernatant liquid by decantation, washed with two 300 ml. portions of warm water and allowed to solidify, and the product then collected on the filter. The 5-chloronitrobenzene-2-sulfonyl chloride thus obtained is added portionwise to 500 ml. of 28% ammonia hydroxide and cooled in an ice bath over a period of 30 minutes. The mixture then is heated for 2 hours on the steam bath, cooled and the product collected on the filter. Recrystallization from aqueous alcohol yields 5-chloro-2-sulfamylnitrobenzene.

Step C.—A suspension of 28.4 g. (0.12 mole) of the thus obtained 5-chloro-2-sulfamylnitrobenzene in a mixture of 50 ml. of methanol and 95 ml. of water containing 4 g. of cupric chloride is heated on the steam bath at 70° C. Six additions, each consisting of 5 g. of iron powder followed by 20 ml. of concentrated hydrochloric acid, are made over a period of 3½ hours. The temperature is maintained between 70 and 80° C. After final addition of iron powder and concentrated hydrochloric acid, the mixture is heated between 80–85° C. for 2 hours and then cooled to room temperature and filtered. The filtrate is cooled in an ice bath and neutralized with aqueous sodium hydroxide to give 5-chloro-2-sulfamylaniline.

Step D.—A solution of 25 g. of 5-chloro-2-sulfamylaniline in 50 ml. of chlorosulfonic acid is heated on the steam bath for 2 hours, cooled, and poured onto ice. The solid which forms is collected, washed with water, and added portionwise to 150 ml. of concentrated ammonium hydroxide. The mixture then is heated on the steam bath for one hour, cooled, and the precipitate which forms is collected on the filter and recrystallized from aqueous ethanol to give 5-chloro-2,4-disulfamylaniline, as colorless needles, M.P. 251–252° C.

EXAMPLE 2

*5-chloro-2,4-disulfamylaniline*

By replacing the 2,5-dichloronitrobenzene employed in Example 1, Step A, by an equal molar quantity of 3,4-dichloronitrobenzene and following substantially the same procedures described in Example 1, Steps A through D, there is obtained 5-chloro-2,4-disulfamylaniline, as colorless needles, M.P. 251–252° C.

EXAMPLE 3

*5-ethoxy-2,4-disulfamylaniline*

Step A.—By replacing the 2,5-dichloronitrobenzene employed in Example 1, Step A, by an equimolecular quantity of 2-chloro-5-ethoxynitrobenzene, and following substantially the same procedures described in Example 1, Steps A and B, there is obtained 5-ethoxy-2-sulfamylnitrobenzene.

Step B.—A suspension of 0.1 mole of the thus obtained 5-ethoxy-2-sulfamylnitrobenzene in a mixture of 50 ml. of 10% sodium hydroxide and 250 ml. of 10% ammonium hydroxide is heated on the steam bath until the sulfamyl compound dissolves. To this solution there is added a solution of 180 g. of ferrous sulfate in 600 ml. of water and the reaction mixture is heated for an additional two hours on the steam bath and filtered. The filtrate is acidified with hydrochloric acid to precipitate the 5-ethoxy-2-sulfamylaniline.

Step C.—By replacing the 5-chloro-2-sulfamylaniline employed in Step D, of Example 1 by an equimolecular quantity of the thus obtained 5-ethoxy-2-sulfamylaniline, and following substantially the same procedure described in Step D of Example 1, there is obtained 5-ethoxy-2,4-disulfamylaniline.

EXAMPLE 4

*5-propyl-2-N-propylsulfamyl-4-sulfamylaniline*

Step A.—p-n-Propylacetanilide (35.4 g.) is added portionwise over a period of 15 minutes to a mixture of 35 ml. of concentrated nitric acid and 35 ml. of glacial acetic acid cooled in an ice bath. After one hour at 0–10° C., the mixture is poured onto ice. The solid which forms is collected on the filter and then heated on the steam bath for two hours with 100 ml. of 50% sulfuric acid, cooled and poured onto ice. Crystallization of the solid thus formed from aqueous alcohol gives 2-nitro-4-n-propylaniline.

Step B.—The thus obtained 2-nitro-4-n-propylaniline (24.4 g.) is added to a solution of 30 ml. of concentrated sulfuric acid and 100 ml. of water and the resulting mixture is cooled to 0–5° C. A solution of 7 g. of sodium nitrite in 20 ml. of water is added slowly at this temperature and the mixture is allowed to stand for two hours at 0–5° C. after which it is filtered. The filtrated is added dropwise to a boiling mixture of 100 ml. of water, 6.4 g. of copper sulfate, 15.6 g. of sodium bromide, and 2 g. of copper powder. Heating is continued for an additional 30 minutes after which the mixture is cooled and extracted with ether. The ethereal extract is washed with water, dried over sodium sulfate, and evaporated to dryness yielding 2-nitro-4-propylbromobenzene.

Step C.—To a solution of sodium disulfide in 1500 ml. of 90% ethanol, prepared as described in Example 1, Step A, there is added dropwise a solution of 2 moles of the 2-nitro-4-propylbromobenzene, obtained as described above, in 95% ethanol over a period of 2 hours. The mixture is heated at 70° C. for 6 hours and, after cooling in an ice bath, the precipitate is collected by suction filtration, transferred to a 1 liter beaker, and stirred thoroughly with 500 ml. of water to remove the sodium chloride. The precipitate which forms is collected on the filter, washed with 100 ml. of alcohol and dried at 55° C. yielding di-(4-propyl-2-nitrophenyl) disulfide.

Step D.—A stream of chlorine is passed into a mixture of the thus obtained di-(4-propyl-2-nitrophenyl) disulfide in acetic acid at the rate of about 2 bubbles per second. The temperature is maintained at 50° C. by intermittent heating on the steam bath over a period of two hours. The 5-propyl-nitrobenzene-2-sulfonyl chloride thus formed is separated from the supernatant liquid by decantation, washed with two 300 ml. portions of warm water and allowed to solidify, and the product then collected on the filter. The 5-propyl-benzene-2-sulfonyl chloride thus obtained is cooled in an ice bath and added portionwise to an aqueous solution of propylamine which also is cooled in an ice bath. After all of the sulfonyl chloride compound has been added, the mixture is heated for 1 hour at 75° C., cooled, and the product collected on the filter. Recrystallization from aqueous alcohol yields 5-propyl-2-N-propylsulfamylnitrobenzene.

Step E.—A suspension of 5 g. of the thus obtained 5-propyl-2-N-propylsulfamylnitrobenzene and 500 mg. of a 5% palladium on charcoal catalyst in 100 ml. of 50% aqueous ethanol is shaken in an atmosphere of hydrogen until three molar equivalents of hydrogen is absorbed. The reaction mixture then is heated to the boiling point and the hot solution filtered and concentrated until 5-propyl-2-N-propylsulfamylaniline crystallizes.

Step F.—The 5-propyl-2-N-propylsulfamylaniline thus obtained then is chlorosulfonated and amidated by substantially the same procedure described in Step D of Example 1, yielding 5-propyl-2-N-propylsulfamyl-4-sulfamylaniline.

EXAMPLE 5

5-nitro-2,4-disulfamylaniline

Step A.—By replacing the 2,5-dichloronitrobenze employed in Example 1, Step A, by an equimolecular quantity of 2,4-dinitrobromobenzene, and following substantially the same procedures described in Steps A and B of Example 1, there is obtained 2,4-dinitrobenzenesulfonamide.

Step B.—The 2,4-dinitrobenzenesulfonamide obtained as described above (24.7 g., 0.1 mole), is dissolved in 500 ml. of methanol at 60–75° C. by the addition of 80 ml. of 10% aqueous sodium hydroxide. A solution of sodium hydrosulfide (prepared from 55.2 g. of sodium sulfide and 19.3 g. of sodium bicarbonate dissolved in 100 ml. of water at 50° C.) is added over a period of 10–15 minutes. The mixture is heated at 70° C. for two hours and then concentrated in vacuo until 300 ml. of alcohol is removed. The residue is cooled in an ice bath and the solid collected on the filter, transferred to a beaker and treated with excess hydrochloric acid to give nitrosulfamylaniline. The precipitated product is separated by filtration, washed with water, and recrystallized from dilute alcohol.

Step C.—The thus obtained nitrosulfamylaniline or its isomeric mixture (0.5 mole), is added portionwise with stirring to 200 ml. of chlorosulfonic acid cooled in an ice bath. Sodium chloride (175 g.) is added portionwise over 1–2 hours and the mixture then heated gradually in an oil bath to 150° C. After 3 hours at 150–160° C., the flask is cooled in an ice bath and the contents treated with a liter of cold water. The product is extracted with ether and the extract washed with water and dried over sodium sulfate. After removal of ether on the steam bath, the residue is added portionwise to 100 ml. of 28% ammonium hydroxide cooled in an ice bath. The mixture is heated on the steam bath for 1 hour, cooled and the product collected on the filter, washed with water, and dried. Crystallization from aqueous ethanol yields 5-nitro-2,4-disulfamylaniline, M.P. 260–262° C.

EXAMPLE 6

5-amino-2,4-disulfamylaniline

By replacing the 5-propyl-2-N-propylsulfamylnitrobenzene employed in Step E of Example 4, by an equimolecular quantity of the nitrosulfamylaniline, obtained as described in Example 5, Step B, and following substantially the same procedures described in Steps E and F of Example 4, there is obtained 5-amino-2,4-disulfamylaniline, M.P. 245–246° C. (dec.).

EXAMPLE 7

5-chloro-2,4-disulfamylaniline

Step A.—By replacing the nitrosulfamylaniline employed in Step C of Example 5 by an equimolecular quantity of 5-chloro-nitrobenzene-2-sulfonyl chloride, obtained as described in Step B of Example 1, and following substantially the same procedure described in Step C of Example 5, there is obtained 5-chloro-2,4-disulfamylnitrobenzene.

Step B.—By replacing the 5-chloro-2-sulfamylnitrobenzene employed in Step C of Example 1, by an equimolecular quantity of the thus obtained 5-chloro-2,4-disulfamylnitrobenzene and following substantially the same procedure described in Step C of Example 1, there is obtained 5-chloro-2,4-disulfamylaniline, as colorless needles, M.P. 251–252° C.

While the above examples illustrate specific conditions for the preparation of disulfamylaniline compounds by the novel method of this invention, it is to be understood that modifications can be made in the reaction conditions described in the examples and in the reactants employed without departing from the scope of this invention as defined by the appended claims.

This application is a continuation-in-part of my co-pending United States patent application, Serial No. 683,694, filed September 13, 1957, now U.S. Patent No. 2,910,475.

What is claimed is:

1. A process for preparing disulfamylaniline compounds comprising heating between about 50–100° C. a solution of a halonitrobenzene having one of the structures

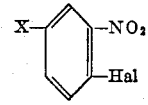

and

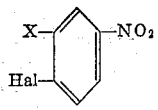

and an alkali disulfide to form a disulfide having one of the structures di-(4-X-2-nitrophenyl) disulfide and di-(2-X-4-nitrophenyl) disulfide which then is oxidized by heating at between about 25–70° C. with chlorine to a sulfonyl chloride having one of the structures 5-X-nitrobenzene-2-sulfonyl chloride and 3-X-nitrobenzene-4-sulfonyl chloride which is amidated with at least 2 equivalents of a compound selected from the group consisting of ammonia and a mono-lower-alkylamine to form the corresponding sulfonamide which then is reduced in the presence of a substance selected from iron powder in an acidic medium, ferrous sulfate in an alkaline medium, sodium hydrosulfide, a platinum catalyst and a palladium catalyst, to convert the nitro to the amino group and subsequently chlorosulfonating the aniline compound thus obtained by heating at between about 50–100° C. with at least two equivalents of chlorosulfonic acid and then amidating by treatment with at least two equivalents of a compound selected from the group consisting of ammonia and a mono-lower-alkylamine to form a disulfamylaniline compound having the general structure

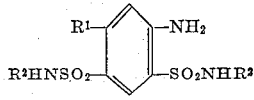

wherein in each of the above structures X is selected from the group consisting of a halogen, a lower alkyl radical, a lower alkoxy radical, and the nitro group; Hal is selected from the group consisting of chloride and bromide atoms; $R^1$ is selected from the group consisting of halogen, a lower alkyl radical, a lower alkoxy radical, the nitro and the amino groups; and $R^2$ is selected from the group consisting of hydrogen and a lower alkyl radical.

2. A process as claimed in claim 1 wherein the nitro group of a sulfamyl compound having one of the structures 5-X-2-sulfamylnitrobenzene and 3-X-4-sulfamylnitrobenzene, wherein X is selected from the group consisting of a halogen, a lower alkyl radical, a lower alkoxy radical, and the nitro group is reduced in the presence of iron powder in an acidic medium to form the corresponding aniline compound.

3. A process as claimed in claim 1 wherein the nitro group of a sulfamyl compound selected from the group consisting of a compound having one of the structures 5-X-2-sulfamylnitrobenzene and 3-X-4-sulfamylnitrobenzene, and 5-X-2,4-disulfamylnitrobenzene, wherein X is selected from the group consisting of a halogen, a lower alkyl radical, a lower alkoxy radical, and the nitro group, is chemically reduced with iron powder in the presence of hydrochloric acid.

4. A process as claimed in claim 1 wherein in each of the two amidation steps the sulfonyl chloride is reacted with at least two equivalents of concentrated ammonium hydroxide.

5. A process as claimed in claim 1 wherein the sulfonyl chloride having one of the structures 5-X-nitrobenzene-2-sulfonyl chloride and 3-X-nitrobenzene-4-sulfonyl chloride is amidated with a mono-lower-alkylamine.

6. A process as claimed in claim 1 wherein the sulfonyl chloride having one of the structures 5-X-nitrobenzene-2-sulfonyl chloride and 3-X-nitrobenzene-4-sulfonyl chloride is amidated with two equivalents of a mono-lower-alkylamine.

7. A process as claimed in claim 1 wherein the sulfonyl chloride having one of the structures 5-X-nitrobenzene-2-sulfonyl chloride and 3-X-nitrobenzene-4-sulfonyl chloride is chlorosulfonated by heating between about 100–200° C. with at least two equivalents of chlorosulfonic acid and then amidated by treatment with at least four equivalents of a compound selected from the group consisting of ammonia and a mono-lower-alkylamine to form the 5-X-2,4-disulfamylnitrobenzene, the nitro group of which compound is reduced in the presence of a substance selected from iron powder in an acidic medium, ferrous sulfate in an alkaline medium, sodium hydrosulfide, a platinum catalyst and a palladium catalyst, to form a disulfamylaniline compound having the general structure

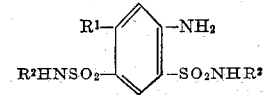

wherein in each of the above structures X is selected from the group consisting of a halogen, a lower alkyl radical, a lower alkoxy radical, and the nitro group; $R^1$ is selected from the group consisting of halogen, a lower alkyl radical, a lower alkoxy radical, the nitro and the amino groups; and $R^2$ is selected from the group consisting of hydrogen and a lower alkyl group.

References Cited in the file of this patent

UNITED STATES PATENTS

| 2,261,175 | McNally | Nov. 4, 1941 |
| 2,464,044 | Kamlet | Mar. 8, 1949 |
| 2,631,167 | Werner | Mar. 10, 1953 |

OTHER REFERENCES

Northey: The Sulfonamides and Allied Compounds, ASC Monograph Series No. 106, pp. 12–13, Reinhold Publ. Corp. (1948).

Beilstein's Organische Chemie, 4th ed., vol. 11, pp. 73–75, System No. 1520 (1928).

Barber: Jour. of the Chemical Society, vol. 1943, pp. 101–104 (1943).

Limpricht: Berichte Deutsche Chemische Gesellschaft, vol. 8, p. 289 (1875).

Migrdichian: Organic Synthesis, vol. 2, Reinhold Publ. Corp., New York (1957) pp. 1657; 1672–3; 1687–9; 1690–1691.